(12) United States Patent
Nikulla et al.

(10) Patent No.: US 12,242,180 B1
(45) Date of Patent: Mar. 4, 2025

(54) TOOL DRIVE SYSTEM

(71) Applicant: United States of America as represented by the Administrator of NASA, Washington, DC (US)

(72) Inventors: Paul E. Nikulla, Greenbelt, MD (US); Jonathan Kraeuter, Elkridge, MD (US); Mark Behnke, Perry Hall, MD (US); Edward James, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 618 days.

(21) Appl. No.: 17/589,191

(22) Filed: Jan. 31, 2022

(51) Int. Cl.
| | | |
|---|---|---|
| *B25J 15/00* | (2006.01) | |
| *B25J 19/04* | (2006.01) | |
| *B64G 4/00* | (2006.01) | |
| *G03B 3/10* | (2021.01) | |

(52) U.S. Cl.
CPC ............ *G03B 3/10* (2013.01); *B25J 15/0066* (2013.01); *B25J 19/04* (2013.01); *B64G 4/00* (2013.01); *B64G 2004/005* (2013.01)

(58) Field of Classification Search
CPC .................................................... B25J 15/0066
See application file for complete search history.

(56) References Cited

U.S. PATENT DOCUMENTS

| | | | | |
|---|---|---|---|---|
| 4,773,815 A | * | 9/1988 | Lemelson | ................ B25J 5/005 |
| | | | | 901/41 |
| 4,897,014 A | * | 1/1990 | Tietze | .................. B25J 15/0491 |
| | | | | 414/729 |
| 8,201,649 B2 | * | 6/2012 | Andrus | ................... F41H 7/005 |
| | | | | 180/9.1 |
| 8,794,418 B1 | * | 8/2014 | Norton | ................ B25J 17/0208 |
| | | | | 901/29 |

(Continued)

FOREIGN PATENT DOCUMENTS

JP  2017202491 A  *  11/2017  ........... B21D 43/057

OTHER PUBLICATIONS

Goddard Space Flight Center, Greenbelt, Maryland, "Advanced Tool Drive System (ATDS) Camera Positioning Mechanism (CPM)," Jun. 1, 2017, Tech Briefs, https://www.techbriefs.com/component/content/article/27065-gsc-16873-1, accessed Oct. 31, 2024 (Year: 2017).*

*Primary Examiner* — Gerald McClain
(74) *Attorney, Agent, or Firm* — Derek J. Langdon; Matthew F. Johnston; Trent J. Roche

(57) ABSTRACT

An advanced tool drive system (ATDS) is capable of grasping a variety of tools through a common interface and provides multiple modes of operation for these tools for these tools. The ATDS is a combination of both a tool actuator and tool change-out mechanism and provides three nested drive actuators-two rotary and one linear. In addition to the tool drive, the ATDS includes four brushless direct current (BLDC) motors which provide the actuation torque (Continued)

to accomplish the multiple modes of ATDS operation, and a camera positioning mechanism (CPM) capable of viewing features on a client satellite or asteroid. By consolidating the drive actuation motors within the ATDS, the design of mating tools becomes less complex and reduces risk and cost of multiple drive actuators having to be installed in multiple tools.

18 Claims, 3 Drawing Sheets

(56) References Cited

U.S. PATENT DOCUMENTS

| | | | | |
|---|---|---|---|---|
| 10,058,966 | B2* | 8/2018 | Zagar | B23Q 11/1023 |
| 11,499,383 | B2* | 11/2022 | McCormick | E21B 17/085 |
| 2019/0369681 | A1* | 12/2019 | Chai | H01R 13/6335 |
| 2022/0193926 | A1* | 6/2022 | Mathis | B25J 15/0408 |

* cited by examiner

TOOL DRIVE SYSTEM

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to an advanced tool drive system (ATDS) capable of grasping a variety of tools through a common interface and at the same time, providing multiple modes of operation for these tools. In addition to the tool drive, the ATDS includes four brushless direct current (BLDC) motors which provide the actuation torque to accomplish the multiple modes of ATDS operation, and a camera positioning mechanism capable of viewing features on a client satellite or asteroid.

2. Description of the Related Art

Future robotic servicing of a satellite in low earth orbit (LEO) or geosynchronous earth orbit (GEO) requires advanced systems capable of meeting the harsh environments of space. To that end, a more efficient tool drive system is necessary that has multiple modes of operation for robotic servicing in space applications.

More specifically, the GEO environment exposes motors to numerous risks, including a wide range of temperatures, from −40° C. to +225° C. and radiation hazards, among others. Thus, reducing the risk from these hazards, at a lower cost and higher efficiency, are important in the development of new ATDS systems. Since prior art ATDS systems included a plurality of actuators, each of which had different requirements for stall torque and speed capabilities, using these systems without physical commonality and with having varying performance requirements, was a challenge.

In particular, the BLDC motor or gearmotor, has two main components—the gearhead and the motor. Accordingly, having a common gearhead across the plurality of BLDC motors, and a common design of the bearings supporting the gearhead's planetary and spur gears, which could reduce complexity and increase robustness of critical components of the gearhead which carries the torque transmission loads, was needed. Further, with the planned robotic operations and limitations on the overall size and mass of the ATDS, the packaging of the motors inside the ATDS, and maintaining the necessary torque margins of safety, were other important design requirements needed.

SUMMARY OF THE INVENTION

The present invention relates to an advanced tool drive system (ATDS) capable of grasping a variety of tools through a common interface and at the same time, providing multiple modes of operation for these tools. In addition to the tool drive, the ATDS includes four brushless direct current (BLDC) motors which provide the actuation torque to accomplish the multiple modes of ATDS operation, and a camera positioning mechanism (CPM) capable of viewing features on a client satellite or asteroid.

The present invention is unique in its flexibility that allows any number of unique tools with the tool plate interface to be attached and actuated. By consolidating the drive actuation motors within the ATDS, the design of mating tools becomes less complex and reduces risk and cost of multiple drive actuators having to be installed in multiple tools.

In one embodiment, the ATDS of the present invention is a combination of both a tool actuator and tool change-out mechanism, and its novel features lie in the capabilities that it provides in the form of its three (3) nested drive actuators, two rotary and one linear. Additionally, it is unique in its efficiency in the coupling process, by which it establishes three (3) interfaces, structural, mechanical and electrical, in one process which allows the three mating functions at one time.

In one embodiment, the structural mating process of coupling a tool at the ATDS tool drive interface is accomplished by use of a kinematic mount design, three (3) alignment features, where "canoe balls" make first contact with the mating V-grooves of a tool interface plate, thereby enabling a highly accurate alignment of the tool onto the tool drive. As the alignment of tool-to-tool drive progresses, a set of radially located locking balls 117 are pressed into a uniquely profiled mating tool plate ring of the tool interface plate, and a single coupling cam ring applies a significant pre-load thereon. The subsequent coupled configuration between the ATDS and tool, provides a significant level of strength and stiffness. The profile of the mating interface of the common interface on the tool's side or common tool plate, has been designed to meet the unique needs of the ATDS coupling, ball lock mechanism.

In one embodiment, during the coupling process, mechanical mating takes place of the ATDS' three (3) nested rotary drives with the tool's drive interfaces spline interface.

Finally, in one embodiment, electrical mating occurs during the coupling process where the blindmate connectors on the ATDS mate to the tool's electrical connectors.

In one embodiment, in addition to coupling to various tools, the tool drive can also be used to couple to any other mechanism which has the mating tool interface plate features available. For example, an Orbital Replacement Unit (ORU) may be grasped by the ATDS coupler and then maneuvered from a stowage location to a client satellite. In one embodiment, the ATDS can provide power and data services through the blindmate electrical connectors to the attached tool or ORU.

The ATDS of the present invention has the advantages of: 1) combining the functions of both tool change-out mechanism and tool actuation into one mechanism; 2) being capable of two different rotary actuations and a linear actuation; and 3) providing for electrical service pass through to tools and ORU.

In one embodiment, the ATDS has an ultra-low mass design to reduce arm tip mass which is required for ground tests and robot arm calibration without the need of a gravity offloading system, which further streamlines and makes operations more efficient.

In one embodiment, the novelty of the CPM of the present invention lies in its capability to provide robotic teleoperators with adjustable views of a client satellite worksite. By being able to extend and pitch the camera/lens assembly of the CPM, the view provided can be adjusted for each unique situation, whether using a short or long tool, or whether the worksite is approached by the robot at an off angle, the CPM can move and adjust to meet each particular situation. Further, as a modular design, the CPM can also be used in other locations on the robot arm or elsewhere on the servicing payload.

In one embodiment, a multi-functional robotic end effector interfaces with and operates a plurality of robotic tools, the multi-functional robotic end effector including: a core section including: a ball-lock coupler system which allows the core section to mate to a common tool plate supporting at least one robotic tool; a multi-drive assembly including a plurality of rotary drives extended by the ball-lock coupler system, and a linear drive, each of which function independently of one another; a blindmate connector system including a plurality of blindmate connectors, the blindmate connector system which is extended by the ball-lock coupler system to engage with the at least one robotic tool and transmit electrical power and signal to the at least one robotic tool; an extension assembly which supports the plurality of blindmate connectors and controls an extension/retraction of a plurality of rotary drive sockets and the plurality of blindmate connectors, the extension assembly which is actuated simultaneously by the ball-lock coupler system; a vision system including at least one camera system with a corresponding camera position mechanism (CPM); and an input/output (I/O) electronic controller disposed in an I/O housing which controls the multi-functional robotic end effector.

In one embodiment, the ball-lock coupler system is a compliant actuation drive system during extension and mating operations and a rigid retraction to ensure full retraction for demating operations, the ball-lock coupler system which further includes: a ball-lock cam assembly including a cam ring, said ball-lock cam assembly which is driven by a coupler gearmotor; a ball-lock retainer which mates onto the tool plate, the ball-lock retainer including a plurality of locking balls which are deployed from the cam ring; a pushrod assembly including a push plate and a plurality of pushrods, the pushrod assembly which operates with the extension assembly to control an extension motion of the plurality of rotary drive sockets and the plurality of blindmate connectors.

In one embodiment, the ball-lock coupler system further includes: a ball screw assembly including a ball screw shaft and a ball screw nut; wherein each pushrod of the plurality of pushrods is attached to the ball screw nut of said ball screw assembly; and wherein the coupler gearmotor is a three (3)-phase brushless direct current (BLDC) motor and drives a 2:1 spur gear set which provides torque and rotates the ball screw shaft and translates the ball screw nut to translate rotary motion into linear motion to push/pull the push plate which applies a thrust force to the plurality of pushrods, to extend/retract the cam ring and the extension assembly and applies the coupler pre-load onto the at least one robotic tool.

In one embodiment, the pushrod assembly further includes: an inner rod that advances the extension assembly; an outer compression spring that applies a mating preload onto the cam ring; and a pushrod linear bearing which constrains motion of each of the plurality of pushrods.

In one embodiment, the linear drive is nested inside the ball screw assembly and separate from the ball-lock coupler system, the linear drive having a separate gearmotor, and a separate pushrod attached to a separate integral ball screw assembly.

In one embodiment, the extension assembly further includes: a fixed inner ring mounted to a front cover of the core section; a translating outer ring attached to the plurality of blindmate connectors and which translates for mating and de-mating operations to the at least one robotic tool; wherein the translating outer ring has a forward section onto which each of the plurality of pushrods is mounted, the outer ring which extends/retracts with the plurality of pushrods; and a linear bearing assembly including: a carriage supported on a rail; a plurality of sets of recirculating balls; and a plurality of linear bearings which guide a translation motion of the translating outer ring; wherein a mount for the plurality of blindmate connectors and a mount for the linear bearing assembly are compliant; and wherein the extension assembly is operated by the coupler gearmotor via positive driving action by the plurality of pushrods to extend/retract a carriage and support a plurality of compression springs.

In one embodiment, the ball-lock cam assembly further includes: a plurality of sets of needle roller bearing assemblies which constrain motion of the cam ring and prevent binding during extension/retraction operations of the ball-lock coupler system; wherein the locking balls deployed by the cam ring apply a mating preload onto the tool plate to align the at least one robotic tool for mating of the plurality of rotary drive sockets and the plurality of blindmate connectors; and wherein the ball-lock retainer provides reaction support while under the coupler pre-load; and a fail-safe friction brake connected to the coupler gearmotor holds angular position and the coupler preload, and prevents the ball-lock coupler system from back driving.

In one embodiment, the ball-lock coupler system is retracted on condition that the coupler gearmotor drives the ball screw assembly counterclockwise to retract the extension assembly and the cam ring; and the coupler gearmotor has a repeating torque versus coupler position profile during extension and retraction operations.

In one embodiment, the extension assembly further includes a plurality of guide forks mounted to the translating outer ring which retract or extend a plurality of springs disposed on a rotating drive shaft rotated by a pick-off gear, and deployed from the plurality of rotary drive sockets; and on condition that the plurality of drive sockets are fully engaged onto the at least one robotic tool, the plurality of guide forks separate from each of the plurality of rotary drive sockets when fully extended.

In one embodiment, the plurality of rotary drives of the multi-drive assembly includes the plurality of gearmotors, a plurality of rotating driveshafts, and the rotating and translating rotary drive sockets; and further including a plurality of splines which mechanically couple each of said rotary drive sockets to each of said plurality of driveshafts and allows each of said plurality of drive sockets to translate and rotate relative to each of said plurality of rotating driveshafts.

In one embodiment, each gearmotor is modular and has a single frame size which allows a plurality of torque and speed combinations, multiple load capacities, and relatively higher load and relatively lower speed within a same motor frame size.

In one embodiment, the blindmate connector system includes: a plurality of female connectors mounted on said translating outer ring and adapted to receive a corresponding number of male connectors from the at least one robotic tool; a pair of compression springs in a compliant mount; wherein said plurality of blindmate connectors float axially and are fixed in two lateral directions.

In one embodiment, the multi-functional robotic end effector further includes: a support plate; and a housing which provides mounts for the support plate, the push rod assemblies, the I/O engine housing and the multi-drive assembly; wherein the front cover includes a plurality of cover for each of the plurality of blindmate connectors, the plurality of covers which support a plurality of rails of the extension assembly and are attached to the housing by a plurality of threaded posts.

In one embodiment, the vision system includes: at least one camera system including: a camera head assembly; an extension mechanism; a pitch mechanism; a variable lighting system; and a launch lock system.

In one embodiment, the camera head assembly includes a camera system including at least one of: a motorized zoom lens (MZL) camera position mechanism (CPM); and a fixed focal length lens (FFL) camera position mechanism (CPM); wherein the MZL CPM and the FFL CPM are mounted 90 degrees orthogonally relative to one another; and wherein the extension mechanism and the pitch mechanism exhibit extension and pitch motions in two degrees of freedom.

In one embodiment, the variable lighting system of the camera system includes color-visible wavelengths and integral light-emitting-diode (LED) lighting with adjustable intensity.

In one embodiment, the camera system is modular and accommodates multiple lens options.

In one embodiment, the MZL CPM and said FFL CPM include a plurality of stepper gearmotors; wherein the plurality of gearmotors is used for positioning of the extension mechanism, the pitch mechanism, and focus and zoom functions on the MZL CPM; and wherein the plurality of gearmotors is controlled by said I/O electronic controller which provides power and signal processing for the MZL CPM and the FFL CPM.

In one embodiment, the CPM of each camera system utilizes each of the plurality of gearmotors to provide pitch adjustment; and wherein the pitch mechanism rotates a focus point in-plane with the extension system and thereby enables adjustable views.

In one embodiment, the CPM includes protective covers for at least the camera head assembly and lighting system; and wherein the camera head assembly includes a camera lens housing having a transparent cover, an electronics support bracket, and a housing.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

Figure 1:
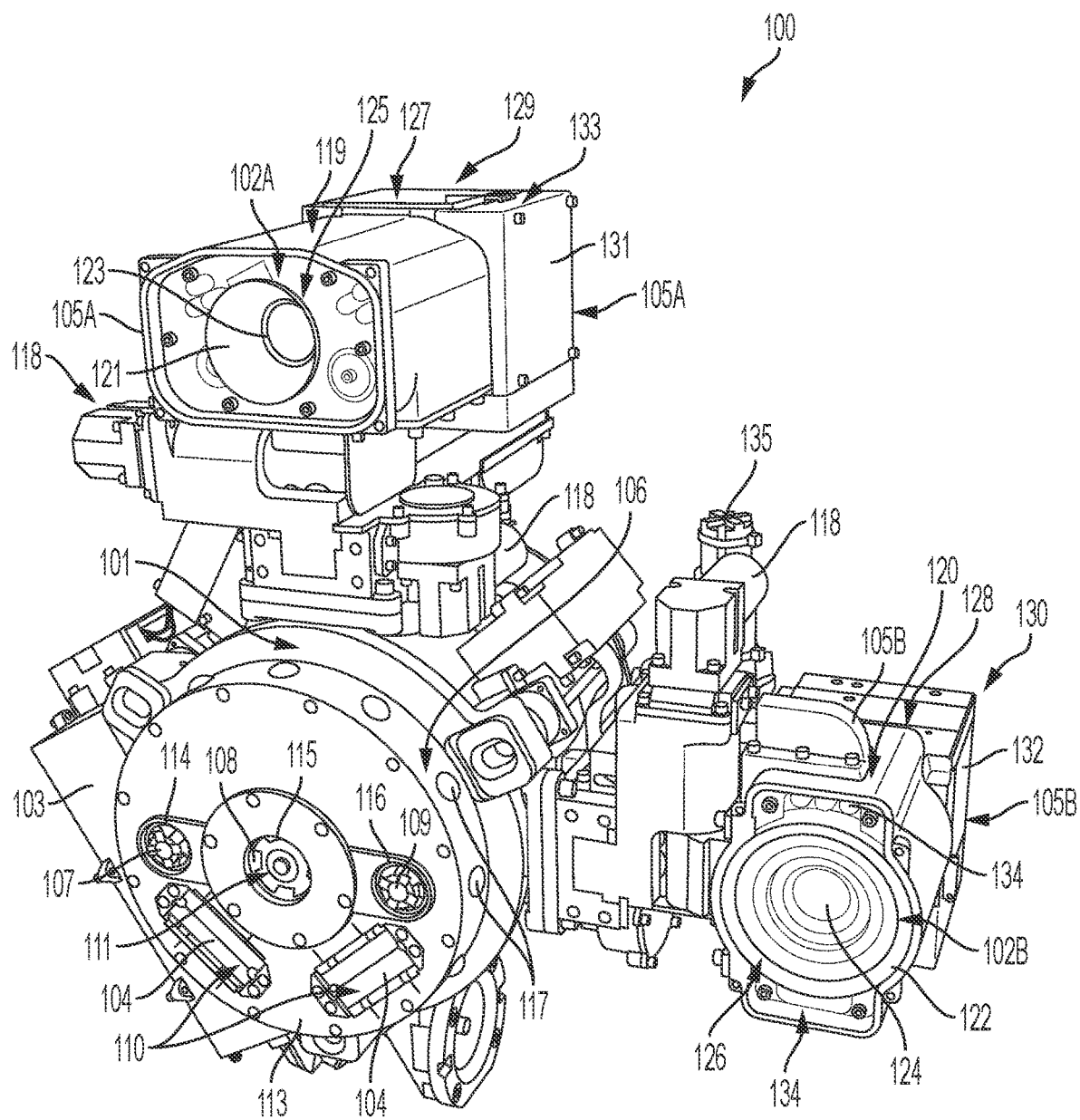
FIG. 1 is a perspective view of the ATDS system, including a vision system having a motorized zoom lens (MZL) camera positioning system (CPM) and a fixed focal length lens (FFL) CPM, according to one embodiment consistent with the present invention.

The present invention relates to an Advanced Tool Drive System (ATDS) 100 (see FIG. 1) or Tool Drive End Effector ("tool drive") 100, which is an electro-mechanical mechanism having a core section 101, a vision system 102A, 102B, and an input/output (I/O) engine (IOE) or controller electronics housing or box 103. In one embodiment, the ATDS 100 is attached to the end of a robotic arm (not shown), which is capable of grasping a variety of tools through a common interface and at the same time, providing multiple modes of operation for these tools.

In one embodiment, the rotary drives 107, 108, 109 and linear drive 111 of the ATDS 100 transmit rotary and linear motions to multiple tools and adapters used to perform various robotic servicing tasks. Tool functions, such as gripping, refueling, cutting wires, etc., are then performed through the actuation of the ATDS rotary drives 107, 108, 109 and linear drive 111. The ATDS gearmotors 214A-D (see FIG. 2) provide the torque output necessary to actuate the drive mechanisms of the ATDS 100, which in turn actuates the attached tool functions. Thus, during robotic servicing of a client satellite, the servicer spacecraft performs a variety of tasks through the robotic manipulation of a variety of tools.

In one embodiment, the vision system 102A, 102B of the ATDS 100 includes a camera system 102A, 102B with two corresponding camera position mechanisms (CPMs) 105A, 105B, that provide light and visibility in support of robot operations. In one embodiment, the CPMs 105A, 105B provide extension and pitch motions in two degrees of freedom, to position the two-camera vision system 102A (motorized zoom lens (MZL)) and 102B (fixed focal length lens (FFL), for optimum viewing and close-range inspection of the worksite required for tele-robotic servicing operations. In one embodiment, the MZL vision system 102A and FFL vision system 102B are color visible wavelength cameras with multiple lens options which can be changed out for specific task requirements.

In one embodiment, a ball-lock coupler system 106 (203, 204 in FIG. 2A) allows the ATDS core 101 to mate onto a common tool plate and extends the rotary drives 107, 108, 109 and blindmate connectors 110 to engage onto a tool. In one embodiment, the blindmate connectors 110 (see 211 in FIG. 2A) (shown with covers 104 in FIG. 1) transmit electrical power and signals to the tool to operate various sensors and tool functions.

In one embodiment, the I/O engine (not shown) disposed in I/O engine box 103, provides signal gain for four brushless direct current (BLDC) gearmotors 214A-D (see FIG. 2A) resolvers which provide the actuation torque to accomplish the multiple modes of ATDS 100 operation and for the CPMs 105A, 105B which allows the vision system 102A, 102B to view features on a client satellite or asteroid. In one embodiment, of the four gearmotors 214A-D, two gearmotors 214A, 214B drive the respective two offset rotary drives 209A, 209C (gearmotor 214A which operates the center drive 209B by the pickoff gear 232 system discussed below); one gearmotor 214C drives the coupler system; and the fourth gearmotor 214D operates the linear drive.

In one embodiment, the I/O engine provides power and signal processing for the CPM's 105A, 105B stepper motors 118 and cameras 102A, 102B. In particular, in one embodiment, the I/O engine controls: 1) the CPM 105A, 105B motor extension and pitch; 2) the MZL vision system 102A zoom and focus; 3) the CPM 105A, 105B launch lock actuation (i.e., launch lock pin 135); 4) the light emitting diode (LED) array 134 intensity control; and 5) the ATDS 100 and tool-based telemetry.

In one embodiment, the I/O engine also provides signal processing for temperature sensors and for some of the blindmate connector 110 lines.

Figure 2A:
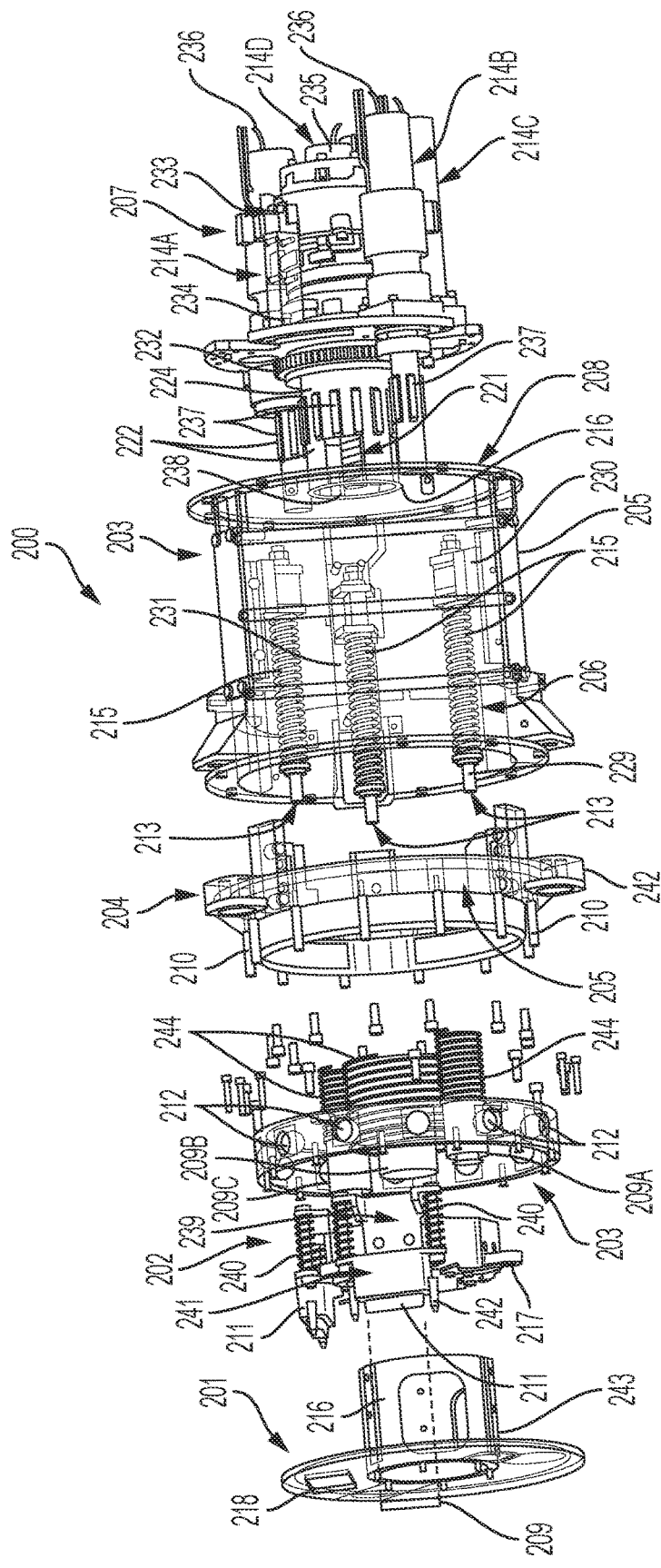
FIG. 2A is an exploded partial internal view of the ATDS system, according to one embodiment consistent with the present invention.
Figure 2B:
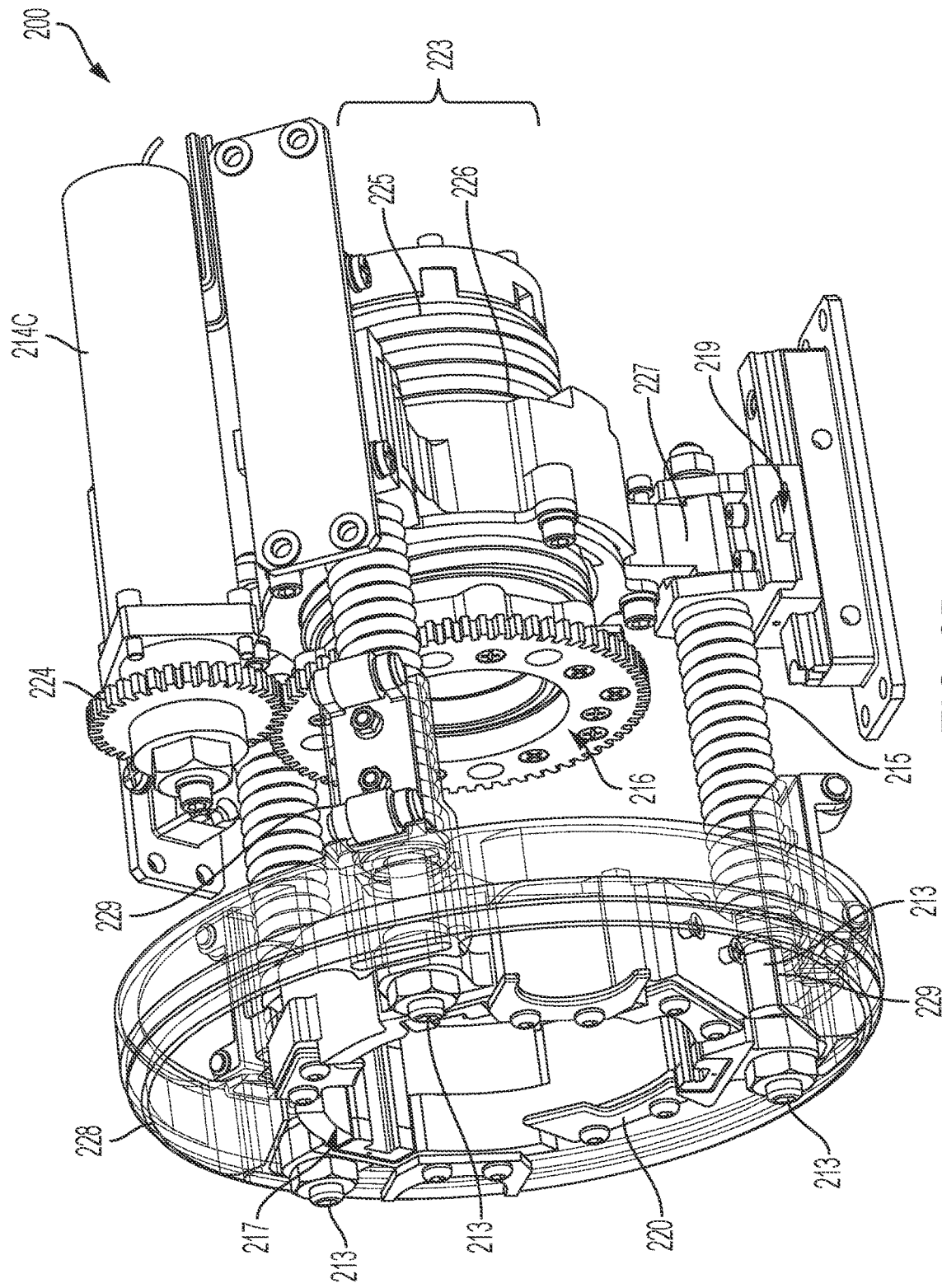
FIG. 2B is a perspective partial internal view of the ATDS system, according to one embodiment consistent with the present invention.

An exploded partial view of the ATDS 200 is shown in FIG. 2A, and FIG. 2B shows a cutaway perspective view of the ATDS 200 as partially assembled.

In one embodiment, the ATDS 200 of the present invention includes a front cover assembly 201 with front cover 218 (reference numeral 113 shown in FIG. 1), an extension assembly 202, a coupler system including a ball-lock retainer 203, a ball-lock cam assembly 204, and a pushrod assembly 206, a support plate 205, a multi-drive assembly 207, and a housing 208.

Detailed descriptions of the ATDS 200 and its component parts are described below.

Front Cover Assembly

In one embodiment, the front cover assembly 201 (see FIG. 2A) includes a front cover 218 or cover plate 218 (reference numeral 113 in FIG. 1), and two blindmate connector covers 104 (see FIG. 1), which support the extension assembly 202 rails 243, and is attached to the housing 208 by a plurality of threaded posts 210 (i.e., 12 posts).

Extension Assembly

In one embodiment, the extension assembly 202 (see FIG. 2A) supports the blindmate connectors 211 (reference numeral 110 in FIG. 1), controls the extension/retraction of three rotary drive sockets 114/209A, 115/209B, 116/209C (see FIG. 1) and two blindmate connectors 211, and is actuated by the ball-lock coupler's three pushrods 213. In one embodiment, the extension assembly 202, which is operated by the coupler drive (gearmotor 214C), controls the extension and retraction of the three rotary drive sockets 114/209A, 115/209B, 116/209C and two blindmate connectors 211 via the positive driving action by the three pushrods 213 to extend/retract the carriage and support the drive socket compression springs 244.

In one embodiment, the extension assembly 202 includes a fixed inner ring 216 and a translating outer ring 217 (see FIGS. 2A and 2B). In one embodiment, the inner ring 216 (see FIG. 2A) is mounted onto the front cover 218, and a linear bearing assembly 219 (see FIG. 2B) including the carriage 230 on a 7 mm wide rail 231, two sets of recirculating balls (not shown), and three linear bearings (not shown), guides the outer ring's 217 translation motion.

In one embodiment, a plurality of guide forks 220 (i.e., five guide forks 220 in FIG. 2B) mounted to the translating outer ring 217 retract or extend the drive socket's deployment springs 221 disposed on a rotating drive shaft 222 which rotates by a pick-off gear 232. In one embodiment, when the drive sockets 209A-209C are fully engaged onto a tool, the guide forks 220 separate from each rotary drive socket 209A-209C when fully extended.

In one embodiment, the extension assembly 202 is used to mate and de-mate to a common tool (not shown) and engages the mechanical devices and blindmate connectors 211. In one embodiment, the two blindmate connectors 211 are rigidly attached to the outer ring 217 and translate for connector tool mating and de-mating operations. The blindmate connector 211 mount and linear bearing 219 mount design are compliant.

Ball-Lock Coupler System

In one embodiment, the ATDS 200 includes a ball-lock coupler system or mechanism having a gearmotor-driven ball-lock cam assembly 204 and ball-lock retainer 203 (see FIG. 2A) used to mate onto a tool plate, with the extension assembly 202. The ball-lock coupler system controls the extension motion of the three rotary drive sockets 209A-209C (see reference numerals 114-116 in FIG. 1) and two blindmate connectors 211.

In one embodiment, the ball-lock mechanism (see FIGS. 2A and 2B) includes the coupler gearmotor 214C, a ball screw assembly 223, the three pushrod assemblies 213 and the cam ring assembly 204. In one embodiment, to activate the ball-lock mechanism, the coupler gearmotor 214C drives a 2:1 spur gear set 224, which provides torque and rotates a ball screw shaft 225 and translates the ball screw nut 226. In one embodiment, the ball screw nut 226 translates rotary motion into linear motion to push/pull a push plate 227 which applies a thrust force onto the three pushrods 213, to extend/retract the cam ring 228 and extension assembly 202 and applies the coupler pre-load. In one embodiment, the push plate 227 is not rigidly attached to the three pushrods 213 to allow for the effects of coefficient of thermal expansion (CTE) mismatch, and to reduce moments loads into the ball screw nut 226.

In one embodiment, each pushrod assembly 213 includes a rigid inner rod 229 that advances the extension assembly 202, and an outer compression spring 215 that applies the mating preload onto the cam ring 228. In one embodiment, the forward section of each pushrod 213 is mounted onto the extension assembly's 202 outer ring 217, which extends and retracts with the pushrods 213. In one embodiment, the pushrod linear bearing 219 constrains the motion of each of the pushrods 213, and three sets of needle roller bearing assemblies 229 constrain the motion of the cam ring 228. In one embodiment, the support plate 205 includes three guide channels that support the three-cam-ring roller bearing assemblies 229 and has mounting features for the three kinematic pads (not shown).

In one embodiment, as the cam ring 228 of the ball-lock coupler system initially extends, it deploys twelve precision locking balls 212 (reference numeral 117 in FIG. 1) to apply the mating preload onto a tool plate (not shown) to align the tool for proper mating of the drive sockets 114, 115, 116 and blindmate connectors 110, 212, and uses the three-needle roller bearing assemblies 229 to prevent binding during extension/retraction operations. In one embodiment, at the coupler's fully extended position, the total mating preload is applied onto the tool plate and the rotary drives 114, 115, 116 and blindmate connectors 110 are fully engaged onto the tool. Thus, in one embodiment, the ball-lock retainer 203 provides reaction support while under the coupler's pre-load, and a failsafe brake on the coupler gearmotor 214C holds the ball-lock coupler preload and prevents the coupler system from back driving.

In one embodiment, to retract the ball-lock coupler assembly, the coupler gearmotor 214C drives the ball screw assembly 223 counterclockwise to retract the extension assembly 202 and the cam ring 228.

In one embodiment, under nominal operations, the coupler's gearmotor 214C has a repeating torque versus coupler position profile during extension and retraction operations used for in-orbit telemetry, for example. In one embodiment, each gearmotor 214A-D provides torque to the ball screw gear 223 and brake holding torque. In one embodiment, the BLDC motors 214A-D are powered by the payload electronics unit in a manner in which the torque output is controlled. The torque provided by each motor 214A-D is applied to its ATDS actuator drive train. The drive train then produces the output torque which operates a tool function or the coupler operation.

In one embodiment, an optical switch as part of an optical sensor assembly 233 indicates the extended and retracted soft-stop positions, and non-jamming ball screw hardstops 234, 235 provide end-of-travel stops in both directions.

Multi-Drive Assembly

In one embodiment, the multi-drive assembly 207 of the present invention includes previously described elements, such as the four gearmotors 214A-D, the coupler's ball and screw assembly 223, and the rotary drive shafts 222 that are all mounted to the inside of the housing 208. In one embodiment, the housing 208 is a light-weighted thin-walled design that provides high precision mounts for the pushrod rail support plate 205, three push rod assemblies 213, I/O engine housing 103, and the multi-drive assembly 207. The linear drive and left and right rotary drives are independent functions and discussed further below.

a. Linear Drive

In one embodiment, the linear drive of the present invention provides a linear actuation force to operate various tool functions. The linear drive is independent of the ball-lock coupler system. The linear drive is nested inside the coupler's ball screw assembly 223 but both systems are independent assemblies. The linear drive has a separate pushrod 223, ball screw nut and shaft and separate hardstops from the coupler system.

In one embodiment, the linear drive includes a gearmotor 214D with an integral ball screw assembly (not shown). In one embodiment, the pushrod 223 is attached to the ball screw's nut (not shown) and has a forward non-jamming hardstop (not shown) and aft non-jamming hardstop (not shown) to limit the translation range. In one embodiment, two opposing tabs ride in two channels (not shown) to allow the ball screw nut and pushrod 223 to translate and not rotate.

In one embodiment, the gearmotor 214D (discussed further below) includes a three (3)-phase BLDC motor 214, a two (2)-pole pair resolver, a fail-safe brake 236, a 10:1 single stage planetary gearhead, and an integral ball screw shaft (not shown). In one embodiment, the fail-safe brake 236 prevents the ball screw from back driving and can support a maximum torque of 35 in-lbf. In one embodiment, the pushrod 223 and the protruding tabs are made from a suitable material such as phosphor bronze and will slide inside two precision channels made from 15-5PH. In one embodiment, to provide a low friction and high reliability sliding interface, the fixed channels and sliding tabs are both grease-plated with a suitable application, and the clearances are properly sized to address the CTE mismatch.

b. Rotary Drives

In one embodiment, the offset rotary drives include the BLDC gearmotors 214A-B, rotating driveshafts 222 and rotating and translating rotary drive sockets 114/209A, 115/209B, 116/209C. In one embodiment, (square) splines 237 mechanically couple each rotary drive socket 114, 115, 116 to each driveshaft 107, 108, 109 (respectively) and allow each drive socket 114, 115, 116 to translate and rotate relative to the rotating driveshaft 107, 108, 109.

In one embodiment, a compression spring 244 extends each of the rotary drive sockets 114, 115, 116 for mating onto a tool driveshaft (not shown) and a central drive hardstop 238 limits the rotary drive socket's 114, 115, 116 forward motion. In one embodiment, the male and female splines 237 have precision clearance fits and high-quality surface finishes that ensure low friction non-binding sliding motions to provide reliable mating and de-mating operations onto the tool plate's rotary drive sockets 114-116. In one embodiment, the male and female spline sliding surfaces are grease-plated with a suitable application.

In one embodiment, as noted above, each of the rotary drive's gearmotors 214A-B includes a BLDC 3-phase motor, 2 pole-pair resolver (for motor commutation and position control and sensing), with an operating voltage of between 90-110 VDC (volts of direct current), a fail-safe power-off friction brake 236 (used to hold angular position), and a 100:1 two-stage planetary gearhead. In one embodiment, the BLDC motor 214A/214B includes: an inner rotary drive; an outer rotary drive motor; a linear drive motor; and a coupling drive motor.

In one embodiment, the ATDS BLDC gearmotors 214A-D of the present invention have the unique versatility of a single frame size which allows a variety of torque and speed combinations which meet the different needs of the ATDS drive actuators. Further, the balanced and optimized gear designs allow for multiple load capacities; and dual ball bearings on each planetary gear allows for higher load and lower speed within the same motor 214A-D frame size. Still further, all gearmotors 214A-D used in the present invention are modular in design and can be replaced with more capable gearmotors that can provide higher output and holding torques and/or higher speeds, as desired or as technology develops.

In one embodiment, the ATDS BLDC motor 214A-C rotary drives 209A-209C operate a variety of tools and adapters that perform in-orbit servicing tasks. Typical servicing operating parameters include low speed high torques for breakaway or seating operations, medium speed at medium torques, and quick startup speeds at low torques. In one embodiment, the present invention includes the advantage that with the simple change of a gear component, the motor 214A-D can accommodate a different set of torque and speed requirements.

Connector System

In one embodiment, as previously described, the connector system includes two blindmate connectors 110 and provides electrical power and signal to a mated tool (not shown). In one embodiment, the two female blindmate connectors 110 are mounted on the ATDS 100 side to the extension outer ring 217, and two male connectors (not shown) are mounted onto the tool plate (not shown). In one embodiment, the blindmate connectors 110 are modified and bonded into support brackets 241 (i.e., compliant fixed support mount).

In one embodiment, the support brackets 241 provide the blindmate connectors 110 with compliance in the axial direction and are fixed in the lateral directions. In one embodiment, the compliant mount 241 includes a pair of compression springs 240 to provide the connectors 110 with a desired mating preload, such as 5 to 10 lbf. In one embodiment, to accommodate a fail-to-mate condition the compliant mount 241 also provides a desired axial travel range, such as 0.25". Therefore, if a connector 110 fails to mate the coupler system can continue to advance and allow the coupler system to perform the required mating functions.

In one embodiment, ATDS connector springs 240 provide a mating preload and also allow for a connector 110 fail-to-mate condition without affecting all other extension operations.

In one embodiment, to accommodate mating alignments, the tool connectors float laterally and are fixed in the axial direction (i.e., fixed support mount 239). The ATDS 100 connector 110 float axially and are fixed laterally, and the tool plate connectors float laterally and are fixed axially.

In one embodiment, two tapered alignment pins 242 on the forward section of the ATDS blindmate connector assemblies 110 provide initial alignment of the mating tool connectors before pin/socket engagement. As the ATDS connectors continue to extend, the connector's 110 front alignment features engage and provide the required alignment for proper pin and socket mating.

Vision System

As previously described, in one embodiment, the vision system 102A, 102B of the ATDS (see FIG. 1) includes camera systems (motorized zoom lens (MZL 102A), (fixed focal length lens (FFL 102B), mounted 90° orthogonally relative to each other, with two corresponding camera position mechanisms (CPMs) 105A, 105B. In one embodiment, the CPMs 105A, 105B provide adjustability in two degrees of freedom with accurate, repeatable, and stable positioning of the camera and lens combination.

Note that vision system 102B can be moved into the vertical position (as shown by vision system 102A in FIG. 1), and due to the shown positions of the visions systems 102A, 102B in FIG. 1, not all corresponding elements common to each system 102A, 102B, are visible.

In one embodiment, the vision systems 102A, 102B, are electro-mechanical pointing devices used in conjunction with the tool drive 100 and robotic tools to support the satellite servicing activities performed on a client satellite. In one embodiment, the vision systems 102A, 102B of the present invention provide the visual images of the robotic tools and the worksite—for example, the satellite area to be repaired or the refuel ports of a client's satellite.

In one embodiment, the vision systems 102A, 102B are used for both situational awareness and machine vision camera for a wide variety of robot tasks. During robotic servicing of a client satellite, the servicer spacecraft performs these various tasks through the robotic manipulation of a variety of tools. Tool functions, such as gripping, refueling, cutting wires, etc., are performed either autonomously or tele-robotically by using the camera systems 102A, 102B to view robot operations. The visual acuity and extent of tele-operations required to perform a satellite repair or refuel is significant and involves at the most basic level-1) grasping a tool, 2) removing the tool from its stowage location, 3) maneuvering the tool by robotic arm to the client satellite, 4) actuating the tools function to grip, cut, or refuel, and 5) returning the tool to its stowage location. This basic sequence is then repeated as different tasks are required during the servicing.

In one embodiment, the vision systems 102A, 102B operates as part of a robotic arm (not shown) via command from the robot system and operators. In one embodiment, as a modular design, the vision systems 102A, 102B are installed near the end of the robot arm, as part of the ATDS 100.

In one embodiment, each vision system 102A, 102B includes three (3) major subassemblies: 1) the Extension Mechanism, 2) the Pitch Mechanism, and 3) the Camera Head Assembly.

In one embodiment, the Extension Mechanism utilizes a linear recirculating ball bearing and rack & pinion drive (not shown) to provide stable linear translation with high pitch, roll, and yaw resistance. In one embodiment, a three-quarter inch stepper gearmotor 118 with integral RT-Angle gearhead provides the desired linear extension, such as 0.0 inch to 4.0 inches of linear extension for the MZL CPM 105A, and 0.0 inch to the desired linear expansion-such as 3.5 inches of linear extension—for the FFL CPM 105B, utilizing hard stops (not shown) at Beginning-of-travel (BOT) and End-of-travel (EOT). In one embodiment, an optical limit switch (not shown) is triggered at (BOT) 0.0-inch extension for homing operations. In one embodiment, the CPM stepper gearmotors 118 used for positioning extension and pitch mechanisms, and MZL camera system 102A focus and zoom, are controlled by the ATDS I/O Engine (IOE) 103, which provides power and signal processing for the MZL CPM 105A and the FFL CPM 105B.

In one embodiment, the Pitch Mechanism of the MZL CPM 105A and FFL CPM 105B share many components. In one embodiment, the Pitch Mechanism utilizes the directly driven three-quarter inch OD stepper gearmotor 118 with integral RT-Angle gearhead to provide 0° to 90° of pitch adjustment for the MZL CPM 105A, and 0° to 70° of pitch adjustment for the FFL CPM 105B, to optimally point the camera field-of-view for robotic operations. In one embodiment, an adjustable hard stop (not shown) is installed at 0° "Home" and aligned prior to flight. In one embodiment, an optical switch (not shown) is triggered at 0° pitch for homing operations.

In one embodiment, the Pitch Mechanism includes protective lens housings for the camera head assembly 119, 120, lighting, electronics and thermal hardware (i.e., heater 127 applied on top of camera body). In one embodiment, the MZL CPM 105A and FFL CPM 105B Pitch Mechanism share many of the same components; the primary difference is that light-emitting-diode (LED) arrays (not shown) are mounted directly to the vision system 102A for MZL CPM 105A assembly (instead of camera lens housing 119), and into the lens housing 120 for the FFL CPM 105B assembly. The vision systems 102A, 102B include the integral LED lighting 134 with adjustable intensity to support the visual imaging of a variety of worksites.

In one embodiment, each camera head assembly 129, 130 includes a vision sensor subsystem (VSS) camera 121, 122 paired to a compatible one-inch optical format lens 123, 124. In one embodiment of the present invention, the MZL CPM 105A will utilize a 12-36 mm Motorized Zoom Lens 123, and the FFL CPM 105B will utilize a 6.5 mm Fixed Focal Length Lens 124. In one embodiment, each camera head assembly 119, 120 is delivered to the vision system 102A, 102B aligned, partially tested, ruggedized and ready for final integration.

In one embodiment, the MZL CPM 105A is able to extend forward, for example, up to 4.0 inches, and pitch, for example, from 0° to 90°, while the FFL CPM 105B is able to extend forward, for example, up to 3.5 inches to 4.0 inches, to visualize features far ahead of the tool tip, and pitch, for example, from 0° to 90°, in order to alter the viewing angles.

In one embodiment, the CPM includes protective covers 125, 126 for at least the camera lens housing 119, 120 of the MZL vision system 102A and FFL vision system 102B, and lighting system. More specifically, in one embodiment, each camera lens housing 119, 120 has a lighting cover 125, 126 of transparent polycarbonate which protects the camera 102A, 102B and lens 123, 124.

In one embodiment, the MZL CPM 105A and FFL CPM 105B each include a dual-element heater 127 (not shown in vision system 102B) that are epoxy-bonded to the camera housing 129, 130 and over-taped with a suitable tape, such as aluminum (Al) or silver (Ag)-PTFE tape.

In one embodiment, an electronics support bracket 133 provides mechanical support for thermostats and electrical connectors (not shown). In one embodiment, a protective housing 131 (not shown in vision system 102B) provides mechanical protection for the electrical connections.

In one embodiment, the vision systems 102A 102B utilize flex circuitry to pass electronic signals through moving parts of the CPM 105A, 105B mechanisms. In one embodiment, there are two separate flex harnesses (not shown) inside the vision systems 102A, 103B. In one embodiment, the first flex circuit is dedicated solely to camera video to protect video integrity (i.e., "video flex"), and the second flex circuit is used for all other controller services ("controller flex").

In one embodiment, non-moving components (Extension Mechanism gearmotor, limit switches, etc.) will utilize standard round wire harnesses (not shown) that solder directly to solder points on the controller flex. In one embodiment, two electrical connectors exit the FFL vision system 102A: one 15-pin micro-D for the video flex and one 21-pin micro-D for the controller flex, for example. In one embodiment, six electrical connectors exit the MZL vision system 102B: two 15-pin and one 51-pin micro-Ds for the video flex, along with one 21-pin and two 25-pin micro-Ds for the controller flex, for example.

In one embodiment, the launch lock system of the vision systems 10A, 102B includes a paraffin-actuated launch lock pin puller 135 (not shown for vision system 102A) that removes a launch lock pin. In one embodiment, the launch lock pin 135 holds each CPM 105A, 105B rigidly in place within a pin and clevis interface (not shown) until the vision system 102A, 102B is ready to be used.

Operation

In one exemplary embodiment, during robotic servicing of a client satellite or supporting an asteroid mission, the servicing spacecraft performs a variety of tasks through the robotic manipulation of a variety of tools. The unique capability of the ATDS 100 lies in the fact that its coupling mechanism (described above) allows for the change-out of one tool for another. Additionally, the multiple internal drives of the ATDS 100 of the present invention, provide a coupled tool with the necessary rotational or linear actuations. With these combined capabilities, the ATDS 100 performs the work that would otherwise require multiple robotic systems.

In one embodiment, the ATDS 100 of the present invention is an integral part of the robotic arm which is attached to the exemplary servicing spacecraft. In one embodiment, the two CPMs 105A, 105B which are integral subassemblies of the ATDS 100, operate as part of the robotic arm via command from the robot system and operators. In one embodiment, as a modular design, the vision systems 102A, 102B are installed near the end of the robot arm, as part of the ATDS 100.

In one embodiment, the sequence of ATDS 100 actuations is to grasp a tool at its tool plate interface, remove the tool from its stowage location, maneuver the tool by the robotic arm to the client satellite, and actuate the tools internal drive systems (as described above), thereby actuating the tool to grip, cut, refuel, and then return the tool to its stowage location. This basic sequence is then repeated as different tasks are required during the servicing. While end effectors are known in robot systems, having the capability to perform multiple operations with the same end effector is unique and a key objective of the present invention.

More particularly, in one embodiment, during the capture of a tool, a set of initial alignment features provide the first contact and lead in of the ATDS 100 to the tools interface plate. In one embodiment, once this contact has been made, the locking balls 117 of the coupler mechanism takes over and draws the ATDS 100 and tool together. Mating of electrical connectors takes place during this operation, as well as mating of the rotary drives 107, 108, 109. Finally, in one embodiment, three kinematic mounts are engaged and preloaded to structurally mate the tool to the ATDS and complete the mating operation.

In one embodiment, as each tool is maneuvered to the client worksite, the robotic system commands actuation of the ATDS rotary drive 107, 108, 109 or linear drive 111 or both. In one embodiment, actuation of these drives 107, 108, 109, 111 then engages and/or actuates a mating feature of the tool, thereby gripping, clamping or cutting as needed. After the tool task is complete, in one embodiment, the robot system commands the return of the tool to a stowage location on the servicer. In one embodiment, the ATDS 100 follows the reverse process, as explained previously, to de-mate the tool.

In one embodiment, the ATDS 100 also includes a vision system with camera assemblies 102A, 102B and CPMs 105A, 105B with integral lighting capable of providing the visual images necessary to perform the exemplary satellite servicing and/or asteroid operations. In one embodiment, to support the visual imaging of a variety of worksites, the vision systems 102A, 102B include integral LED lighting 134 with adjustable intensity. In one embodiment, the CPM camera/lens assembly 102A, 102B, 105A, 105B is housed in a carrier (not shown) which can be extended to a point beyond the end of the robot arm, where the tool is located.

In one embodiment, the CPM camera/lens assembly (i.e., vision systems 102A, 102B, and CPMs 105A, 105B) is pointed toward the worksite by the Pitch Mechanism, which rotates the focus point in plane with the extension system and thereby enables adjustable views of the client satellite worksite.

As described above, actuation of the extension and pitch camera/lens mechanisms 102A, 102B, 105A, 105B as well as control of the lens 123, 124 focus, and zoom, are performed by stepper gearmotors 118 (not shown for vision system 102B). By being able to extend and pitch the camera/lens 102A, 102B assembly, the view provided can be adjusted for each unique situation, whether using a short or long tool, or whether the worksite is approached by the robot at an off-angle, the CPM 105A, 105B can move and adjust to meet each particular situation. Further, as a modular design, the vision system 102A, 102B can also be used in other locations on the robot arm or elsewhere on the servicing payload.

In one embodiment, the ATDS 100 of the present invention includes a novel and efficient modular architecture that allows replacing the gearmotors to provide higher output torque, and/or higher output speed, and adding additional blindmate connectors 110 to increase the capability of the electrical services to the common tool interface.

Additionally, in other embodiments, the ATDS core 101 can be scaled to increase or decrease its overall size and capabilities depending on the application.

In one important aspect of the present invention, the overall ATDS 100 architecture was derived to provide an ultra-lightweight and highly compact tool drive system that is required to allow for on-earth testing on a robot arm which is critical for ground verification testing.

Finally, in one important aspect, the three primary sub-assemblies (201, 202, 203, 207, etc.), the tool drive, the vision systems 102A, 102B, and the I/O engine 103 are all very mass critical and were designed to be ultra-lightweight. The ATDS 100 is mounted onto the end of a robot arm and is required to be as light as possible so that ground verification tests can be performed in a one-gravity environment without the use of a gravity off-loading system. A gravity off-loading system complicates ground servicing tests and introduces a level of uncertainty in the verification of performance and the calibration of the robot arm's force torque sensor, which the present invention is able to overcome.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A multi-functional robotic end effector that interfaces with and operates a plurality of robotic tools, the multi-functional robotic end effector comprising:
    a core section including:
        a ball-lock coupler system which allows said core section to mate to a common tool plate supporting at least one robotic tool;
        a multi-drive assembly including a plurality of rotary drives extended by said ball-lock coupler system, and a linear drive, each of which function independently of one another;
        a blindmate connector system including a plurality of blindmate connectors, said blindmate connector system which is extended by said ball-lock coupler system to engage with said at least one robotic tool and transmit electrical power and signal to said at least one robotic tool;
        an extension assembly which supports said plurality of blindmate connectors and controls an extension/retraction of a plurality of rotary drive sockets and said plurality of blindmate connectors, said extension assembly which is actuated simultaneously by said ball-lock coupler system;
    a vision system including at least one camera system with a corresponding camera position mechanism (CPM); and
    an input/output (I/O) electronic controller disposed in an I/O housing which controls the multi-functional robotic end effector
    wherein said ball-lock coupler system is a compliant actuation drive system during extension and mating operations and a rigid retraction to ensure full retraction for demating operations, said ball-lock coupler system which further comprises:
        a ball-lock cam assembly including a cam ring, said ball-lock cam assembly which is driven by a coupler gearmotor;
        a ball-lock retainer which mates onto said tool plate, said ball-lock retainer including a plurality of locking balls which are deployed from said cam ring;
        a pushrod assembly including a push plate and a plurality of pushrods, said pushrod assembly which operates with said extension assembly to control an extension motion of said plurality of rotary drive sockets and said plurality of blindmate connectors;
        a ball screw assembly including a ball screw shaft and a ball screw nut;
        wherein each pushrod of said plurality of pushrods is attached to said ball screw nut of said ball screw assembly; and
        wherein said coupler gearmotor is a three (3)-phase brushless direct current (BLDC) motor and drives a 2:1 spur gear set which provides torque and rotates said ball screw shaft and translates said ball screw nut to translate rotary motion into linear motion to push/pull said push plate which applies a thrust force to said plurality of pushrods, to extend/retract said cam ring and said extension assembly and applies the coupler pre-load onto said at least one robotic tool.

2. The multi-functional robotic end effector according to claim 1, wherein said pushrod assembly further comprises:
    an inner rod that advances said extension assembly;
    an outer compression spring that applies a mating preload onto said cam ring; and
    a pushrod linear bearing which constrains motion of each of said plurality of pushrods.

3. The multi-functional robotic end effector according to claim 2, wherein said linear drive is nested inside said ball screw assembly and separate from said ball-lock coupler system, said linear drive having a separate gearmotor, and a separate pushrod attached to a separate integral ball screw assembly.

4. The multi-functional robotic end effector according to claim 3, wherein said extension assembly is operated by said coupler gearmotor via positive driving action by said plurality of pushrods to extend/retract a carriage and support a plurality of compression springs; and
    wherein said extension assembly further comprises:
        a fixed inner ring mounted to a front cover of said core section;
        a translating outer ring attached to said plurality of blindmate connectors and which translates for mating and de-mating operations to said at least one robotic tool;
        wherein said translating outer ring has a forward section onto which each of said plurality of pushrods is mounted, said outer ring which extends/retracts with said plurality of pushrods; and
        a linear bearing assembly including:
            a carriage supported on a rail;
            a plurality of sets of recirculating balls; and
            a plurality of linear bearings which guide a translation motion of said translating outer ring;

wherein a mount for said plurality of blindmate connectors and a mount for said linear bearing assembly are compliant; and wherein the extension assembly is operated by the coupler gearmotor via positive driving action by the plurality of pushrods to extend/retract a carriage and support a plurality of compression springs.

5. The multi-functional robotic end effector according to claim 4, wherein said ball-lock cam assembly further comprises:

a plurality of sets of needle roller bearing assemblies which constrain motion of said cam ring and prevent binding during extension/retraction operations of said ball-lock coupler system;

wherein said locking balls deployed by said cam ring apply a mating preload onto said tool plate to align said at least one robotic tool for mating of said plurality of rotary drive sockets and said plurality of blindmate connectors; and wherein said ball-lock retainer provides reaction support while under said coupler pre-load; and a fail-safe friction brake connected to said coupler gearmotor holds angular position and said coupler preload, and prevents said ball-lock coupler system from back driving.

6. The multi-functional robotic end effector according to claim 5, wherein said ball-lock coupler system is retracted on condition that said coupler gearmotor drives said ball screw assembly counterclockwise to retract said extension assembly and said cam ring; and wherein said coupler gearmotor has a repeating torque versus coupler position profile during extension and retraction operations.

7. The multi-functional robotic end effector according to claim 6, wherein said extension assembly further comprises:

a plurality of guide forks mounted to said translating outer ring which retract or extend a plurality of springs disposed on a rotating drive shaft rotated by a pick-off gear, and deployed from said plurality of rotary drive sockets; and wherein on condition that said plurality of drive sockets are fully engaged onto said at least one robotic tool, said plurality of guide forks separate from each of said plurality of rotary drive sockets when fully extended.

8. The multi-functional robotic end effector according to claim 7, wherein said plurality of rotary drives of said multi-drive assembly include said plurality of gearmotors, a plurality of rotating driveshafts, and said rotating and translating rotary drive sockets; and further comprising a plurality of splines which mechanically couple each of said rotary drive sockets to each of said plurality of driveshafts and allows each of said plurality of drive sockets to translate and rotate relative to each of said plurality of rotating driveshafts.

9. The multi-functional robotic end effector according to claim 8, wherein each gearmotor is modular and has a single frame size which allows a plurality of torque and speed combinations, multiple load capacities, and relatively higher load and relatively lower speed within a same motor frame size.

10. The multi-functional robotic end effector according to claim 9, wherein said blindmate connector system comprises:

a plurality of female connectors mounted on said translating outer ring and adapted to receive a corresponding number of male connectors from said at least one robotic tool; and a pair of compression springs in a compliant mount;

wherein said plurality of blindmate connectors float axially and are fixed in two lateral directions.

11. The multi-functional robotic end effector according to claim 10, further comprising:

a support plate; and a housing which provides mounts for said support plate, said push rod assemblies, said I/O engine housing and said multi-drive assembly;

wherein said front cover includes a plurality of cover for each of said plurality of blindmate connectors, said plurality of covers which support a plurality of rails of said extension assembly and are attached to said housing by a plurality of threaded posts.

12. The multi-functional robotic end effector according to claim 1, wherein the vision system comprises:

at least one camera system including:
a camera head assembly;
an extension mechanism;
a pitch mechanism;
a variable lighting system; and
a launch lock system.

13. The multi-functional robotic end effector according to claim 12, wherein said camera head assembly includes a camera system including at least one of:

a motorized zoom lens (MZL) camera position mechanism (CPM); and a fixed focal length lens (FFL) camera position mechanism (CPM);

wherein said MZL CPM and said FFL CPM are mounted 90 degrees orthogonally relative to one another; and wherein said extension mechanism and said pitch mechanism exhibit extension and pitch motions in two degrees of freedom.

14. The multi-functional robotic end effector according to claim 13, wherein said variable lighting system of said camera system includes color-visible wavelengths and integral light-emitting-diode (LED) lighting with adjustable intensity.

15. The multi-functional robotic end effector according to claim 14, wherein said camera system is modular and accommodates multiple lens options.

16. The multi-functional robotic end effector according to claim 15, wherein said MZL CPM and said FFL CPM include a plurality of stepper gearmotors;

wherein said plurality of gearmotors is used for positioning of said extension mechanism, said pitch mechanism, and focus and zoom functions on said MZL CPM; and wherein said plurality of gearmotors is controlled by said I/O electronic controller which provides power and signal processing for said MZL CPM and said FFL CPM.

17. The multi-functional robotic end effector according to claim 16, wherein said CPM of each said camera system utilizes each of said plurality of gearmotors to provide pitch adjustment; and wherein said pitch mechanism rotates a focus point in-plane with said extension system and thereby enables adjustable views.

18. The multi-functional robotic end effector according to claim 17, wherein said CPM includes protective covers for at least said camera head assembly and lighting system; and wherein said camera head assembly includes a camera lens housing having a transparent cover, an electronics support bracket, and a housing.

* * * * *